United States Patent
Waltermann et al.

(10) Patent No.: US 10,277,945 B2
(45) Date of Patent: Apr. 30, 2019

(54) CONTEXTUAL QUERIES FOR AUGMENTING VIDEO DISPLAY

(71) Applicant: Lenovo (Singapore) Pte. Ltd., Singapore (SG)

(72) Inventors: Rod D. Waltermann, Rougemont, NC (US); Jefferson Logan Holt, Rolesville, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 470 days.

(21) Appl. No.: 13/857,562

(22) Filed: Apr. 5, 2013

(65) Prior Publication Data

US 2014/0304753 A1 Oct. 9, 2014

(51) Int. Cl.
| | | |
|---|---|---|
| *H04N 21/80* | (2011.01) | |
| *H04N 21/84* | (2011.01) | |
| *H04N 21/8405* | (2011.01) | |
| *H04N 21/462* | (2011.01) | |
| *H04N 21/4722* | (2011.01) | |
| *H04N 21/81* | (2011.01) | |
| *H04N 21/439* | (2011.01) | |
| *H04N 21/44* | (2011.01) | |
| *H04N 21/482* | (2011.01) | |

(52) U.S. Cl.
CPC ..... *H04N 21/4622* (2013.01); *H04N 21/4394* (2013.01); *H04N 21/44008* (2013.01); *H04N 21/4722* (2013.01); *H04N 21/4828* (2013.01); *H04N 21/80* (2013.01); *H04N 21/8133* (2013.01); *H04N 21/84* (2013.01); *H04N 21/8405* (2013.01)

(58) Field of Classification Search
None
See application file for complete search history.

(56) References Cited

U.S. PATENT DOCUMENTS

| | | | | |
|---|---|---|---|---|
| 6,636,238 B1 * | 10/2003 | Amir | ............... | G06F 17/3074 707/E17.101 |
| 7,840,589 B1 * | 11/2010 | Holt | ............... | G06F 17/30672 707/769 |
| 8,762,389 B1 * | 6/2014 | Popovici | ............... | G06F 17/30646 707/748 |
| 9,317,551 B1 * | 4/2016 | Zander | ............... | G06F 17/30864 |
| 2001/0003214 A1 * | 6/2001 | Shastri | ............... | G06F 17/30796 725/109 |

(Continued)

FOREIGN PATENT DOCUMENTS

| | | |
|---|---|---|
| CN | 101267518 A1 | 9/2008 |
| CN | 101719144 A | 6/2010 |

(Continued)

*Primary Examiner* — Ricky Chin
(74) *Attorney, Agent, or Firm* — Ference & Associates LLC

(57) ABSTRACT

An embodiment provides a method, including: deriving text data from an input of audiovisual data; analyzing the text data to form one or more key words; selecting the one or more key words to obtain one or more relevant key words, wherein selecting comprises selection based on text data from user specific data sources; forming the one or more relevant key words into a query for obtaining relevant content; and issuing one or more queries to obtain related content from a network connected device. Other aspects are described and claimed.

21 Claims, 3 Drawing Sheets

(56) References Cited

U.S. PATENT DOCUMENTS

| | | | |
|---|---|---|---|
| 2003/0005461 A1* | 1/2003 | Shinohara | H04N 7/0885 725/110 |
| 2003/0028889 A1* | 2/2003 | McCoskey | H04N 7/17318 725/91 |
| 2007/0106627 A1* | 5/2007 | Srivastava | G06Q 10/10 706/20 |
| 2007/0157284 A1* | 7/2007 | Lee | H04N 5/44513 725/137 |
| 2008/0010251 A1* | 1/2008 | Fontoura | G06F 17/30646 |
| 2008/0066099 A1* | 3/2008 | Brodersen | G06F 17/30038 725/35 |
| 2008/0177994 A1* | 7/2008 | Mayer | G06F 9/4418 713/2 |
| 2008/0204595 A1* | 8/2008 | Rathod et al. | 348/465 |
| 2008/0228746 A1* | 9/2008 | Markus | G06F 17/30864 705/2 |
| 2009/0019028 A1* | 1/2009 | Norris | G06F 17/3087 |
| 2009/0064247 A1* | 3/2009 | Biniak | H04N 7/163 725/105 |
| 2009/0138906 A1* | 5/2009 | Eide | G06F 17/30038 725/32 |
| 2009/0204598 A1* | 8/2009 | Crane | G06F 17/30864 |
| 2010/0005084 A1* | 1/2010 | Nguyen | G06F 17/30796 707/E17.014 |
| 2010/0131986 A1* | 5/2010 | Locker | G06Q 30/0254 725/53 |
| 2011/0137989 A1* | 6/2011 | Kiciman | G06Q 30/02 709/204 |
| 2011/0149153 A1* | 6/2011 | Nam | H04N 21/4307 348/468 |
| 2011/0264657 A1* | 10/2011 | Hoffman | G06F 17/30867 707/728 |
| 2011/0289530 A1* | 11/2011 | Dureau | H04N 21/4622 725/38 |
| 2011/0320441 A1* | 12/2011 | Lee | G06F 17/30867 707/723 |
| 2012/0129504 A1* | 5/2012 | Lee | G06F 17/30699 455/414.1 |
| 2012/0131009 A1* | 5/2012 | Nath | G06F 17/30867 707/741 |
| 2012/0278329 A1* | 11/2012 | Borggaard | G06F 17/30699 707/738 |
| 2013/0041952 A1* | 2/2013 | Silas | G06Q 10/10 709/204 |
| 2013/0044912 A1* | 2/2013 | Kulkarni | G06K 9/00671 382/103 |
| 2013/0110827 A1* | 5/2013 | Nabar | G06Q 10/00 707/728 |
| 2013/0159306 A1* | 6/2013 | Janssen, Jr. | G06F 17/30734 707/737 |
| 2013/0212081 A1* | 8/2013 | Shenoy | G06F 17/30657 707/706 |
| 2014/0067825 A1* | 3/2014 | Oztaskent | H04N 21/4782 707/748 |
| 2014/0101145 A1* | 4/2014 | Alonso | G06F 17/30616 707/728 |
| 2014/0181146 A1* | 6/2014 | Jamthe | G06F 17/30572 707/777 |
| 2014/0188925 A1* | 7/2014 | Skolicki | H04N 21/4622 707/765 |
| 2014/0201240 A1* | 7/2014 | Andavarapu | G06F 17/30023 707/771 |
| 2014/0244631 A1* | 8/2014 | Arthur | G06F 17/2785 707/723 |
| 2015/0347530 A1* | 12/2015 | Wendker | G06F 17/30867 707/723 |
| 2016/0055160 A1* | 2/2016 | Himel | G06F 17/3053 707/728 |
| 2016/0063115 A1* | 3/2016 | Ayan | G06Q 50/01 707/722 |

FOREIGN PATENT DOCUMENTS

| | | |
|---|---|---|
| CN | 102708863 A | 10/2012 |
| CN | 102903362 A | 1/2013 |
| CN | 102999560 A | 3/2013 |

* cited by examiner

CONTEXTUAL QUERIES FOR AUGMENTING VIDEO DISPLAY

BACKGROUND

An increasing number of households now have high definition televisions (HDTVs or TVs) and broadband Internet connections. Consumers watch a significant amount of television on these HDTVs. Consumers are also increasingly accessing media content via the Internet, primarily on traditional desktop and laptop computers, as well as mobile information handling devices (e.g., smart phones, tablets, laptop computers, and the like). These trends are very likely to continue as more HD programming becomes available, more consumers buy HDTVs, and more consumers switch to or obtain wired or wireless broadband Internet connections.

Consumers commonly use personal information handling devices to augment their television watching experiences (such as when using a laptop to track election results or sports scores while watching related content on the television). This trend is also likely to continue, as consumers are constantly seeking out additional information related to a television program, even while watching the programming. Advances in television services and Internet media content related to television services have facilitated this behavior. Ever increasing and accessible ways of manipulating television programs are becoming available (e.g., picture in picture displays, pausing live programs via digital video recorders (DVRs), etc.). Likewise, increasing amounts of Internet media content related to television programs is becoming available.

However, there is currently no conventional way for allowing a user to have a truly integrated television and Internet media experience. Even when watching television programs on an Internet-connected device (e.g., laptop, desktop or mobile computing devices), a truly integrated experience is lacking, as consumers must choose between watching the program and browsing the Internet. Consequently, consumers resort to switching between media devices (e.g., between television and laptop or tablet) or applications manually, in a time consuming and disjointed fashion.

BRIEF SUMMARY

In summary, one aspect provides a method, comprising: deriving text data from an input of audiovisual data; analyzing the text data to form one or more key words; selecting the one or more key words to obtain one or more relevant key words, wherein selecting comprises selection based on text data from user specific data sources; forming the one or more relevant key words into a query for obtaining relevant content; and issuing one or more queries to obtain related content from a network connected device.

Another aspect provides an information handling device, comprising: one or more processors; a data input connection; a network connection; and a memory device storing instructions accessible to the one or more processors, the instruction being executable by the one or more processors to perform acts comprising: deriving text data from an input of audiovisual data; analyzing the text data to form one or more key words; selecting the one or more key words to obtain one or more relevant key words, wherein selecting comprises selection based on text data from user specific data sources; forming the one or more relevant key words into a query for obtaining relevant content; and issuing one or more queries to obtain related content from a network connected device.

A further aspect provides a computer program product, comprising: a storage medium having computer readable program code embodied therewith, the computer readable program code comprising: computer readable program code configured to derive text data from an input of audiovisual data; computer readable program code configured to analyze the text data to form one or more key words; computer readable program code configured to select the one or more key words to obtain one or more relevant key words, wherein selecting comprises selection based on text data from user specific data sources; computer readable program code configured to form the one or more relevant key words into a query for obtaining relevant content; and computer readable program code configured to issue one or more queries to obtain related content from a network connected device.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
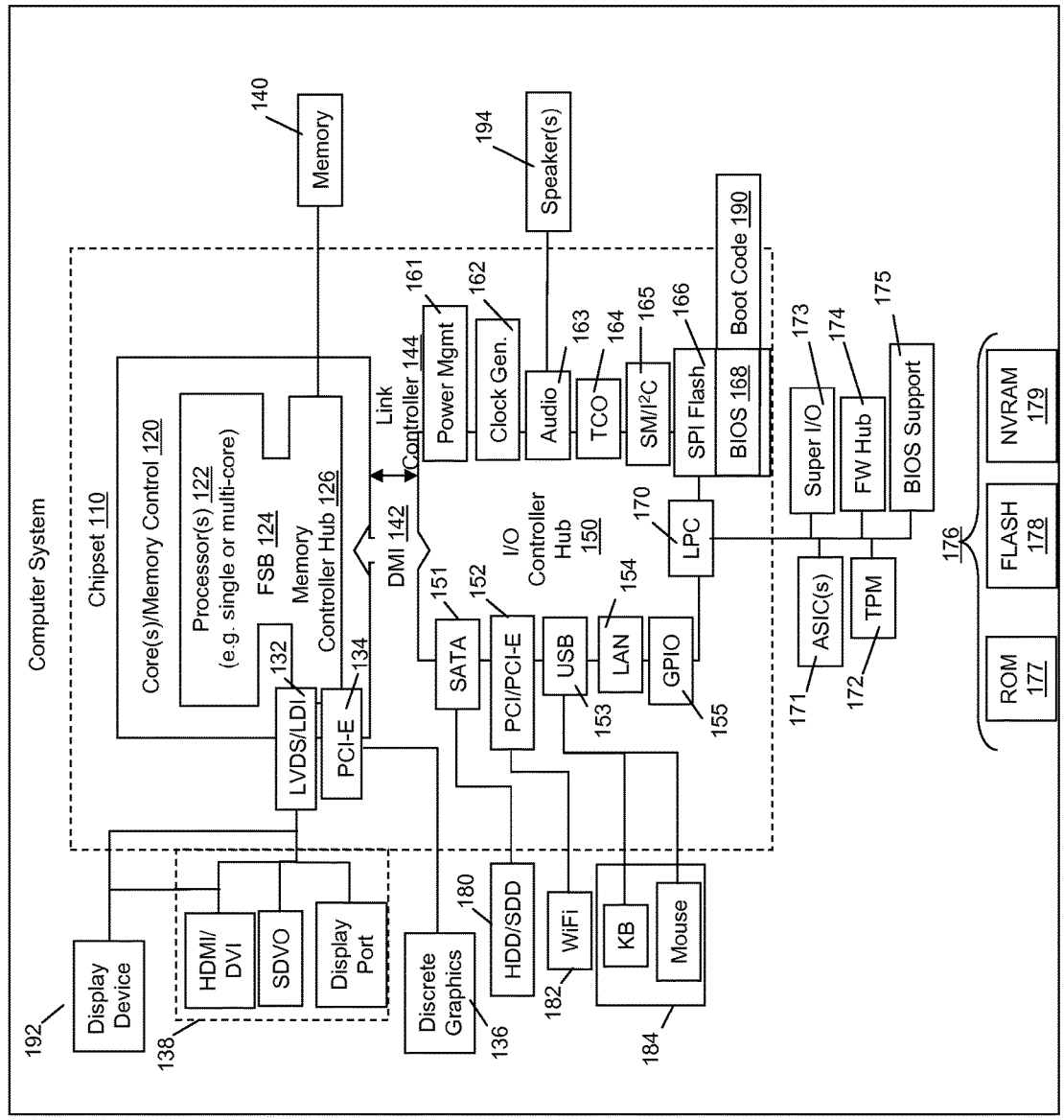
FIG. 1 illustrates an example information handling device and components thereof.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Today a television (TV) viewer (or user) typically has two or more devices, i.e., the TV, and an Internet device, e.g., a phone, a tablet, etc. Viewers often switch between devices during a TV program, e.g., looking up web pages on a tablet while watching a TV program. The trend toward smart TVs, i.e., televisions with Internet connectivity, is solving part of the problem of users having to use multiple devices to obtain content, but smart TVs do not fully integrate the viewer's activities with the current program they are watching.

Thus, smart TVs, BLURAY players, game consoles, etc., which provide movie or video streaming and Internet connections, do not provide for content aware activities. Television content providers attempt to augment broadcast content with additional data, e.g., TWITTER feeds, show/content based web sites, etc., to allow the user more interactivity. For example, existing technologies such as iTV provide for program or station driven interaction, but these services force viewers to interact only based on the options provided by the services. Moreover, these services are generally unfiltered from the viewer's point of view, i.e., not contextually relevant to the specific viewer but rather relevant, at best, the viewers of the program generally.

In contrast, an embodiment empowers the user to select their own mode of exploration and interaction based on dynamically generated search queries and URLs. An embodiment tokenizes data, e.g., forms text data derived from television input or other sources, such as the Internet, including social media content, user created documents and media, email, articles, purchase history data, user input data, etc. ("user specific sources"), to generate a series of context aware search queries. Data used for deriving text data, whether the data is audio, video, web page, document, media, or otherwise derived, or a combination of the foregoing, is collectively referred to as "audiovisual data". Thus, "audiovisual data" may be audio data, video data, web page data, documents or emails derived from a user account, social media data, purchase history of a user, data derived from user inputs, or a combination of the foregoing. The tokens may be optimized based on relevance to provide more relevant content. The optimized set of query tokens then may be passed to an intelligent query engine for determining relevant URLs to display to the user.

The illustrated example embodiments will be best understood by reference to the figures. The following description is intended only by way of example, and simply illustrates certain example embodiments.

FIG. 1 depicts a block diagram of one example of information handling device ("device") circuits, circuitry or components. The example depicted in FIG. 1 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 1.

The example of FIG. 1 includes a so-called chipset 110 (a group of integrated circuits, or chips, that work together, chipsets) with an architecture that may vary depending on manufacturer (for example, INTEL, AMD, ARM, etc.). The architecture of the chipset 110 includes a core and memory control group 120 and an I/O controller hub 150 that exchanges information (for example, data, signals, commands, et cetera) via a direct management interface (DMI) 142 or a link controller 144. In FIG. 1, the DMI 142 is a chip-to-chip interface (sometimes referred to as being a link between a "northbridge" and a "southbridge"). The core and memory control group 120 include one or more processors 122 (for example, single or multi-core) and a memory controller hub 126 that exchange information via a front side bus (FSB) 124; noting that components of the group 120 may be integrated in a chip that supplants the conventional "northbridge" style architecture.

In FIG. 1, the memory controller hub 126 interfaces with memory 140 (for example, to provide support for a type of RAM that may be referred to as "system memory" or "memory"). The memory controller hub 126 further includes a LVDS interface 132 for a display device 192 (for example, a CRT, a flat panel, touch screen, et cetera). A block 138 includes some technologies that may be supported via the LVDS interface 132 (for example, serial digital video, HDMI/DVI, display port). The memory controller hub 126 also includes a PCI-express interface (PCI-E) 134 that may support discrete graphics 136.

In FIG. 1, the I/O hub controller 150 includes a SATA interface 151 (for example, for HDDs, SDDs, 180 et cetera), a PCI-E interface 152 (for example, for wireless connections 182), a USB interface 153 (for example, for devices 184 such as a digitizer, touch screen, keyboard, mice, cameras, phones, microphones, storage, other connected devices, et cetera), a network interface 154 (for example, LAN), a GPIO interface 155, a LPC interface 170 (for ASICs 171, a TPM 172, a super I/O 173, a firmware hub 174, BIOS support 175 as well as various types of memory 176 such as ROM 177, Flash 178, and NVRAM 179), a power management interface 161, a clock generator interface 162, an audio interface 163 (for example, for speakers 194), a TCO interface 164, a system management bus interface 165, and SPI Flash 166, which can include BIOS 168 and boot code 190. The I/O hub controller 150 may include gigabit Ethernet support.

The system, upon power on, may be configured to execute boot code 190 for the BIOS 168, as stored within the SPI Flash 166, and thereafter processes data under the control of one or more operating systems and application software (for example, stored in system memory 140). An operating system may be stored in any of a variety of locations and accessed, for example, according to instructions of the BIOS 168. As described herein, a device may include fewer or more features than shown in the system of FIG. 1.

Devices, as for example outlined in FIG. 1, may include user devices such as a media management system connected in line via a data input with a content feed (e.g., cable television data feed) and a display device (e.g., HDTV). Devices such as the example device outlined in FIG. 1 may be used to derive tokenized data for relevance analysis and search query functionality, as further described herein.

Figure 2:
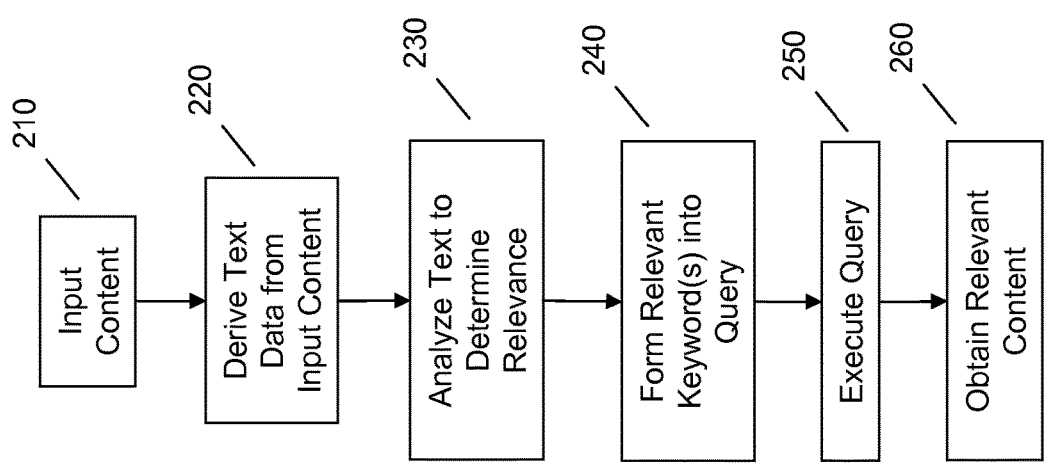
FIG. 2 illustrates an example method of obtaining related media content for a video display.

Referring to FIG. 2, an embodiment accepts input audiovisual data as input content at 210. For input content, an embodiment may use television content such as television broadcast or stream. The television data may include displayable video content such as the text displayed on screen (obtained via optical character recognition) or audio data (e.g., either derived from actual audio using text to speech applications or closed captioning data).

An embodiment may also use audiovisual data derived from the Internet. In the case of Internet content, an embodiment may leverage relevance data, e.g., user account information, to access related Internet data that is user specific (e.g., based on user account information). An example is obtaining a TWITTER feed from a TWITTER account known to be associated with a viewer, e.g., via viewer login information at a smart TV or other device. An embodiment may also use audiovisual data derived from other sources, including user specific sources such as user documents and media, email, articles, purchase histories, user inputs (e.g., user input into a media device, for example search history for movies on a media device), etc. The user specific sources thus may be stored and accessed locally or stored and accessed remotely (e.g., over a network connection). Thus, an embodiment may therefore have access to a variety of audiovisual data as input content at 210.

The input content is used to derive text data at 220. Examples of deriving text data include obtaining the closed caption data of the television stream, obtaining a frame capture of the video data and performing OCR analysis to identify text data content contained therein, importing TWITTER site feed(s) known to be associated with the user and obtaining text data therefrom, importing FACEBOOK or other social media web page(s) and deriving text data therefrom, etc. Thus, an embodiment examines the input content to derive text data therefrom at 220.

Figure 3:
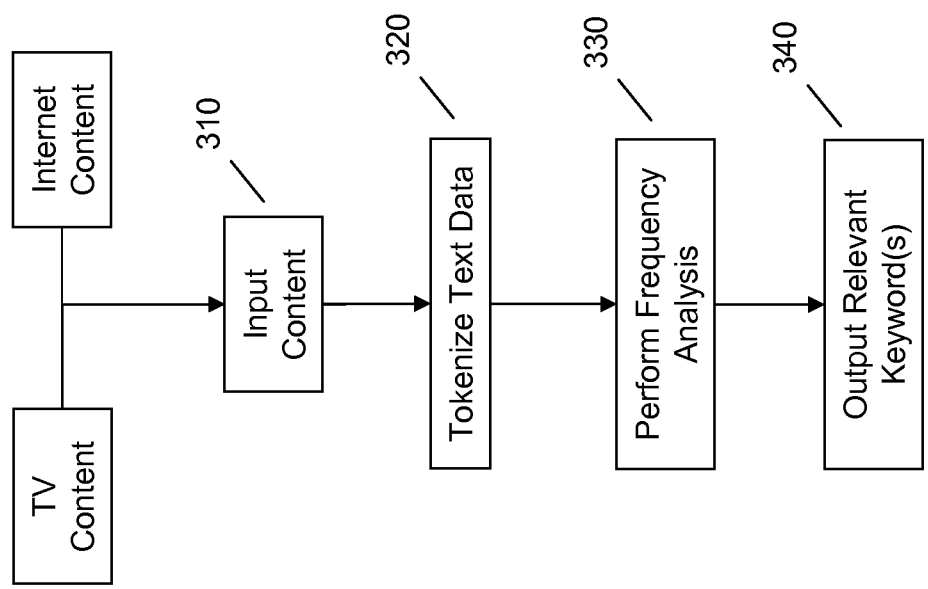
FIG. 3 illustrates an example method of deriving keywords from input audiovisual data.

At 230, the text data is, rather than being blindly packaged into a search query, analyzed in order to determine relevant text data for use in a search query. Thus, referring to FIG. 3, an embodiment uses the input content 310 to tokenize the text data therein at 320. Tokenizing the text data includes, for example, language analysis of the text data structure (e.g., sentence) in order to derive key words included therewith. An example may include grammatical analysis of the sentence in order to identify important words (e.g., verbs, nouns, etc.) used in the language. This tokenization process at 320 then includes analyzing the text derived from the input content in order to indentify key words in a first pass of relevance filtering.

Following this first pass, an embodiment may complete a second pass of relevance filtering of the text data. For example, an embodiment may perform a frequency analysis of the tokenized text data at 330 in order to identify relevant words from within the first pass filtered set. The first pass filtered set may include text data from one or more closed caption sentences, one or more social media web sites, screen captured (and OCR) data, or the like. A combination of the foregoing may be utilized.

An example frequency analysis is FFT analysis of the tokenized text data in order to identify the most frequency used terms. The result of this second pass of relevance filtering is the output of relevant keyword(s) at 340, which may be used for obtaining relevant additional content for the viewer.

Additionally, other sources of audiovisual data, e.g., Internet derived data, user documents, emails, purchase histories, or other user-specific data sources may be similarly used to derive text data and filter the text data, e.g., as described in connection with the derivation of text data from a TV content input stream. Therefore, a first pass filter may be used to find the highest frequency data from TV/media stream (e.g., tokenized and grammatically analyzed) followed by a FFT (or like) analysis to find the key areas of text or keywords.

Given the text data derived from multiple sources (e.g., TV/media input stream and user specific sources), a further filtering or analysis process may be used to find information that correlates to the user's interests (e.g., using social media like FACEBOOK or TWITTER accounts, etc.) to identify an intersection of the outputs, e.g., of the highest ranking FFT data from the TV/Media stream and the user's interest based on the other user specific data sources. For example, the data may be combined with the media stream and treated as a scalar vector followed by computation of the subspace intersection and a frequency analysis to find the highest frequency key word instances, which may then be used for finding relevant additional data or content the user is interested in. Thus, the result of the text data derivation, filtering and keyword identification processes is obtaining text data that will be used in a search for providing additional data that the user is likely to be interested in and is relevant to the current program.

Referring back to FIG. 2, an embodiment uses the relevant key words formed from the analysis in step 240 to form a query which is then executed at 250. The query may be a web query using one or more keywords formed from the analysis. Thus, an embodiment may search the Internet, e.g., using a search engine with one or more of the relevant key words. The search engine may be a popularity based search engine such as GOOGLE Internet search engine, or an intelligent search engine service, e.g., WOLFRAM ALPHA computational knowledge engine or knowledge based search service. Alternatively or additionally, a custom search may be performed on pre-sorted or pre-obtained data, e.g., a custom data set for a particular show or network, etc.

Irrespective of the exact searches or queries utilized, content relevant to the specific program (e.g., via employing closed caption data, OCR screen data, audio data converted to text data, etc.) or relevant to the specific user (e.g., using, alone or in combination with program data, a located social media account or data feed based on a user identification or login, e.g., to a smart TV or other device) may be obtained at 260. The relevant content may be managed in a variety of ways.

For example, the relevant content obtained via querying may be used as overlay or segmented display material (e.g., for a combined display). Additionally or in the alternative, the relevant content obtained may be used as the basis for inviting viewer interaction, e.g., with a smart TV or other device. For example, a viewer may be invited (visually, verbally, etc.) to click on links or icons for the related content or to otherwise cause the related content to be included in an interactive display along with the currently running program.

By tokenizing the data, e.g., closed caption and/or OCR for on screen text and/or social media derived data, an embodiment may generate a series of context aware search queries and therefore provide discrete URLs as related content based on a viewer's current program or video and text. An embodiment uses tokenized content from the on-screen, text, from the dialog from the show (e.g., using text to speech programs) or even from user-linked social media feeds. These tokens may be optimized, for example by running the tokens through a two pass operation to optimize and determine relevance.

Again, in a first pass, the tokens may be optimized by FFT analysis, e.g., for highest frequency usage, based on the weighting of the tokens. A second pass may be made leveraging matrix manipulation to construct a transformation set to find the intersection, or context within the search tokens. This optimized set of query tokens then may be passed to one or more intelligent query engines for determining relevant URLs to display to the user. The URLs and content may then be displayed to the user in a combined display on the display device (e.g., HDTV).

It will also be understood that the various embodiments may be implemented in one or more information handling devices configured appropriately to execute program instructions consistent with the functionality of the embodiments as described herein. In this regard, FIG. 1 illustrates a non-limiting example of such a device and components thereof.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

Any combination of one or more non-signal device readable medium(s) may be utilized. The non-signal medium may be a storage medium. A storage medium may be any non-signal medium, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), a personal area network (PAN), or the connection may be made through other devices (for example, through the Internet using an Internet Service Provider) or through a hard wire connection, such as over a USB connection.

Aspects are described herein with reference to the figures, which illustrate example methods, devices and program products according to various example embodiments. It will be understood that the actions and functionality illustrated may be implemented at least in part by program instructions. These program instructions may be provided to a processor of a general purpose information handling device, a special purpose information handling device, or other programmable data processing device or information handling device to produce a machine, such that the instructions, which execute via a processor of the device implement the functions/acts specified.

The program instructions may also be stored in a device readable medium that can direct a device to function in a particular manner, such that the instructions stored in the device readable medium produce an article of manufacture including instructions which implement the function/act specified.

The program instructions may also be loaded onto a device to cause a series of operational steps to be performed on the device to produce a device implemented process such that the instructions which execute on the device provide processes for implementing the functions/acts specified.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
deriving text data from an input of audiovisual data;
analyzing the text data to form one or more key words;
deriving additional text data from at least one user specific data source, wherein the at least one user specific data source is associated with prior user inputs and is irrespective of content provided in the audiovisual data;
analyzing the additional text data to form additional one or more key words;
selecting, from the one or more key words and the additional one or more key words, one or more relevant key words, wherein the one or more relevant key words are associated with frequently used words in the one or more key words and the additional one or more key words;
receiving social media data from at least one social media source;
analyzing the social media data to identify user interest data;
identifying an intersection between the one or more relevant key words and the user interest data, the intersection comprising at least one query word;
forming the at least one query word into a query for obtaining relevant content; and
automatically issuing one or more queries to obtain related content from a network connected device.

2. The method of claim 1, wherein the input of audiovisual data comprises one or more of displayable video data, audio data, and closed caption data.

3. The method of claim 1, wherein the at least one user specific data source comprises one or more of social media content, email content, documents, purchase history, and user input.

4. The method of claim 1, wherein the analyzing comprises tokenizing the text data to form one or more key words comprises performing a language analysis to identify one or more key words from a string of text data.

5. The method of claim 4, wherein the selecting comprises selection based upon conducting a frequency analysis to identify one or more frequently used key words.

6. The method of claim 1, wherein issuing one or more queries to obtain related content from a network connected device comprises issuing a query to a search engine.

7. The method of claim 1, wherein issuing one or more queries to obtain related content from a network connected device comprises issuing a query to a knowledge based search service.

8. The method of claim 1, wherein issuing one or more queries to obtain related content from a network connected device comprises issuing a query to a database having predefined contents stored therein.

9. The method of claim 1, further comprising inviting user interaction after obtaining the related content.

10. The method of claim 9, wherein inviting user interaction after obtaining the related content comprises providing one or more of audio and visual output to a viewer inviting interaction with one or more links to the related content.

11. An information handling device, comprising:
one or more processors;
a data input connection;
a network connection; and
a memory device storing instructions accessible to the one or more processors, the instruction being executable by the one or more processors to perform acts comprising:
deriving text data from an input of audiovisual data;
analyzing the text data to form one or more key words;
deriving additional text data from at least one user specific data source, wherein the at least one user specific data source is associated with prior user inputs and is irrespective of content provided in the audiovisual data;
analyzing the additional text data to form additional one or more key words;
selecting, from the one or more key words and the additional one or more key words, one or more relevant key words, wherein the one or more relevant key words are associated with frequently used words in the one or more key words and the additional one or more key words;
receiving social media data from at least one social media source;
analyzing the social media data to identify user interest data;
identifying an intersection between the one or more relevant key words and the user interest data, the intersection comprising at least one query word;
forming the at least one query word into a query for obtaining relevant content; and
automatically issuing one or more queries to obtain related content from a network connected device.

12. The information handling device of claim 11, wherein the input of audiovisual data comprises one or more of displayable video data, audio data, and closed caption data.

13. The information handling device of claim 11, wherein the at least one user specific data source comprises one or more of social media content, email content, documents, purchase history, and user input.

14. The information handling device of claim 11, wherein the analyzing comprises tokenizing the text data to form one or more key words comprises performing a language analysis to identify one or more key words from a string of text data.

15. The information handling device of claim 14, wherein the selecting comprises selection based upon conducting a frequency analysis to identify one or more frequently used key words.

16. The information handling device of claim 11, wherein issuing one or more queries to obtain related content from a network connected device comprises issuing a query to a search engine.

17. The information handling device of claim 11, wherein issuing one or more queries to obtain related content from a network connected device comprises issuing a query to a knowledge based search service.

18. The information handling device of claim 11, wherein issuing one or more queries to obtain related content from a network connected device comprises issuing a query to a custom database having predefined contents stored therein.

19. The information handling device of claim 11, wherein the acts further comprise inviting user interaction after obtaining the related content.

20. The information handling device of claim 19, wherein inviting user interaction after obtaining the related content comprises providing one or more of audio and visual output to a viewer inviting interaction with one or more links to the related content.

21. A computer program product, comprising:
a storage device having computer readable program code embodied therewith, the computer readable program code comprising:
computer readable program code that derives text data from an input of audiovisual data;
computer readable program code that analyzes the text data to form one or more key words;
computer readable program code that derives additional text data from at least one user specific data source, wherein the at least one user specific data source is associated with prior user inputs and is irrespective of content provided in the audiovisual data;
computer readable program code that analyzes the additional text data to form additional one or more key words;
computer readable program code that selects, from the one or more key words and the additional one or more key words, one or more relevant key words, wherein the one or more relevant key words are associated with frequently used words in the one or more key words and the additional one or more key words;
computer readable program code that receives social media data from at least one social media source;
computer readable program code that analyzes the social media data to identify user interest data;
computer readable program code that identifies an intersection between the one or more relevant key words and the user interest data, the intersection comprising at least one query word;
computer readable program code that forms the at least one query word into a query for obtaining relevant content; and
computer readable program code that automatically issues one or more queries to obtain related content from a network connected device.

* * * * *